United States Patent [19]

Lore et al.

[11] 4,196,678
[45] Apr. 8, 1980

[54] LAWN COMBINE

[75] Inventors: Pat Lore, Oakdale; Stanley L. Weber, Westbury, both of N.Y.

[73] Assignee: Lawn-A-Mat Chemical & Equipment Corp., Westbury, N.Y.

[21] Appl. No.: 926,606

[22] Filed: Jul. 21, 1978

[51] Int. Cl.² .............................................. A01C 7/08
[52] U.S. Cl. ...................................... 111/10; 111/77; 111/80; 222/305
[58] Field of Search ................... 111/1, 10, 11, 12, 34, 111/73, 80, 85, 77; 222/305, 307

[56] References Cited

U.S. PATENT DOCUMENTS

| 557,987 | 4/1896 | Frank | 222/307 X |
|---|---|---|---|
| 3,247,812 | 4/1966 | Luciand et al. | 111/1 |
| 3,446,165 | 5/1969 | Magda et al. | 111/11 |
| 3,544,013 | 12/1970 | Dorfman | 111/11 X |
| 3,685,468 | 8/1972 | Paige et al. | 111/11 |
| 3,822,655 | 7/1974 | Benedict | 111/11 |
| 3,826,209 | 7/1974 | Jackson | 111/10 X |
| 3,893,515 | 7/1975 | Sadler | 111/10 |

FOREIGN PATENT DOCUMENTS 900000 6/1945 France ....................................... 222/307

Primary Examiner—Robert E. Bagwill
Assistant Examiner—James R. Feyrer
Attorney, Agent, or Firm—Allison C. Collard; Thomas M. Galgano

[57] ABSTRACT

A lawn combine is provided which has a frame including a plurality of rotatable wheels supporting and coupled to the frame and a drive-actuated rotatable aerator movably mounted on the frame for movement between a lower operative position, in which it is disposed for engagement with a lawn surface and an upper raised, inoperative position, in which it is disposed for non-engagement with the lawn surface. Drive-actuated feeding devices are mounted on the frame for feeding materials in prescribed dosages to the lawn surface in an area generally beneath the frame and a drive assembly is mounted on the frame for propelling at least one of the wheels of the frame and for actuating the aerator and the feeding devices.

10 Claims, 17 Drawing Figures

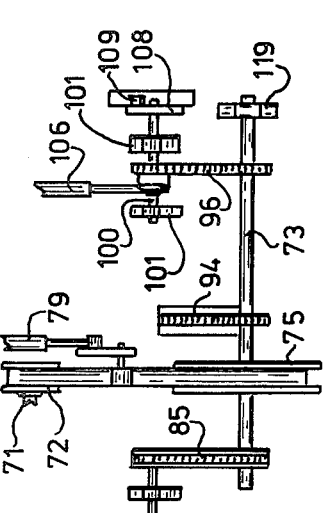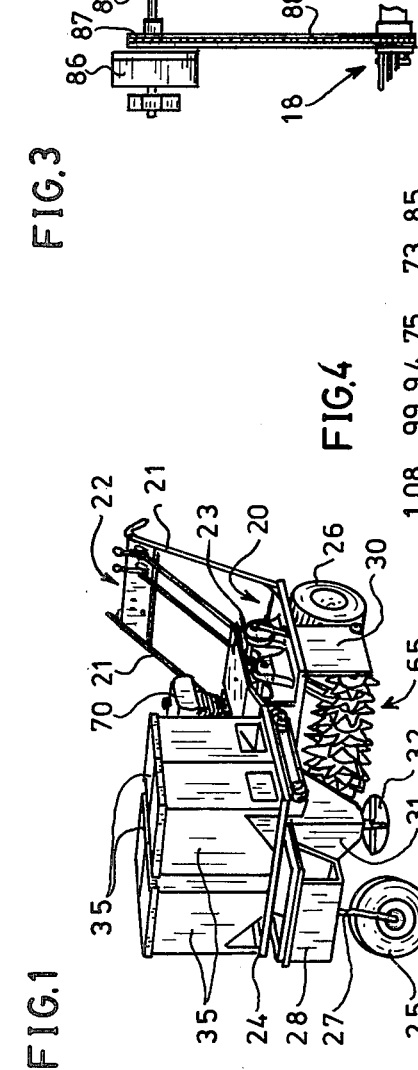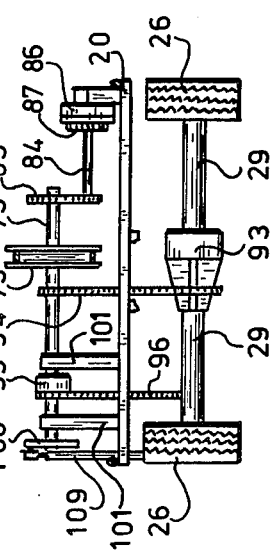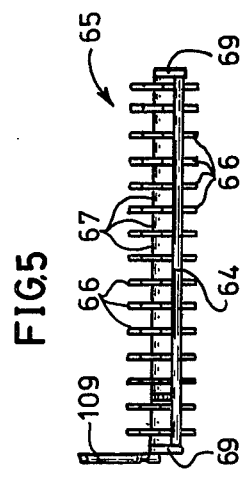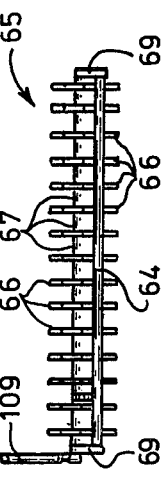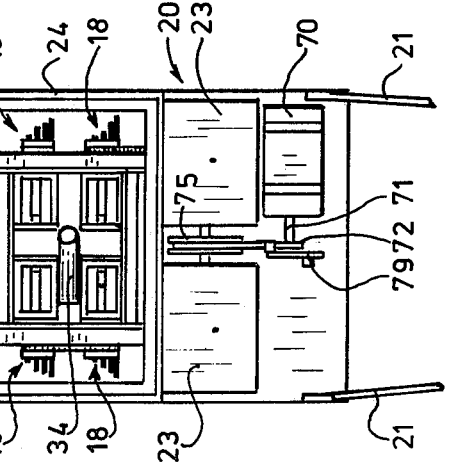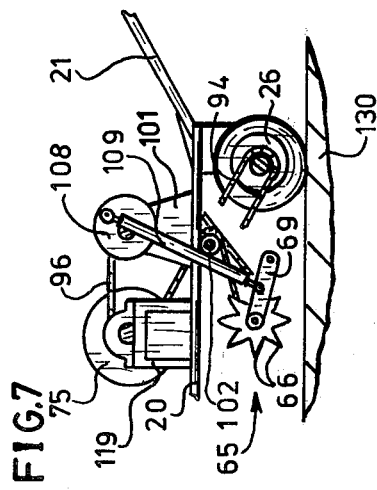

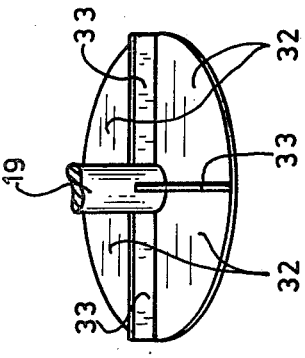
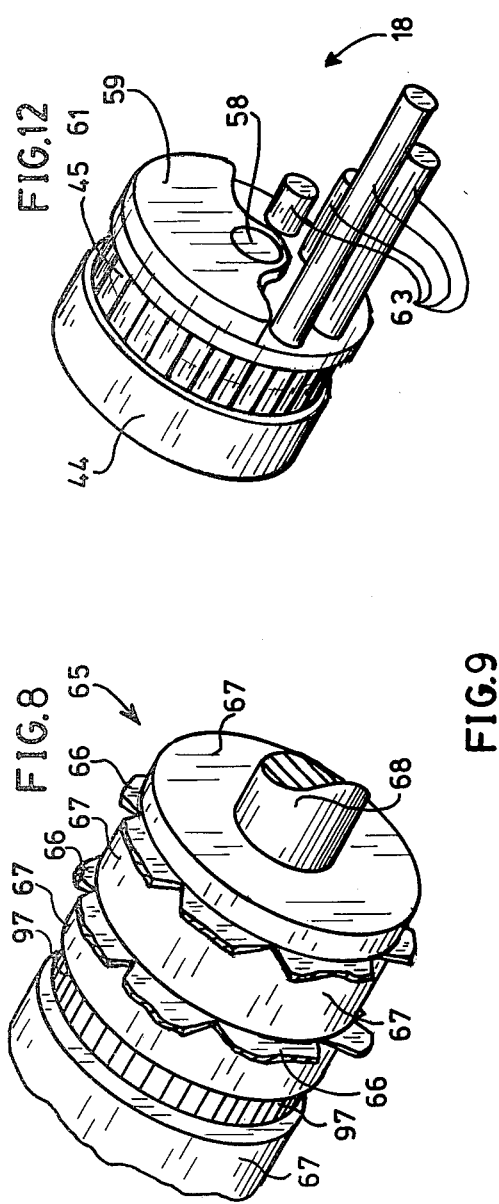
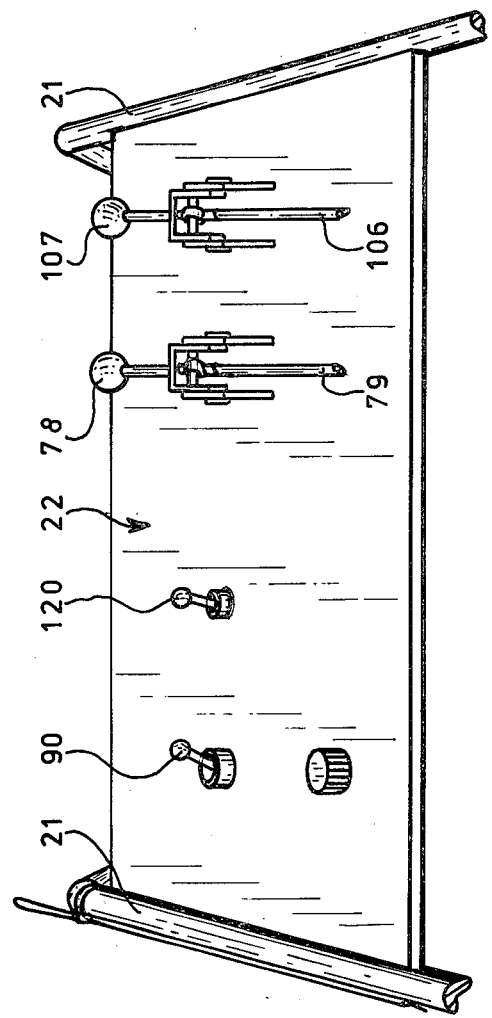

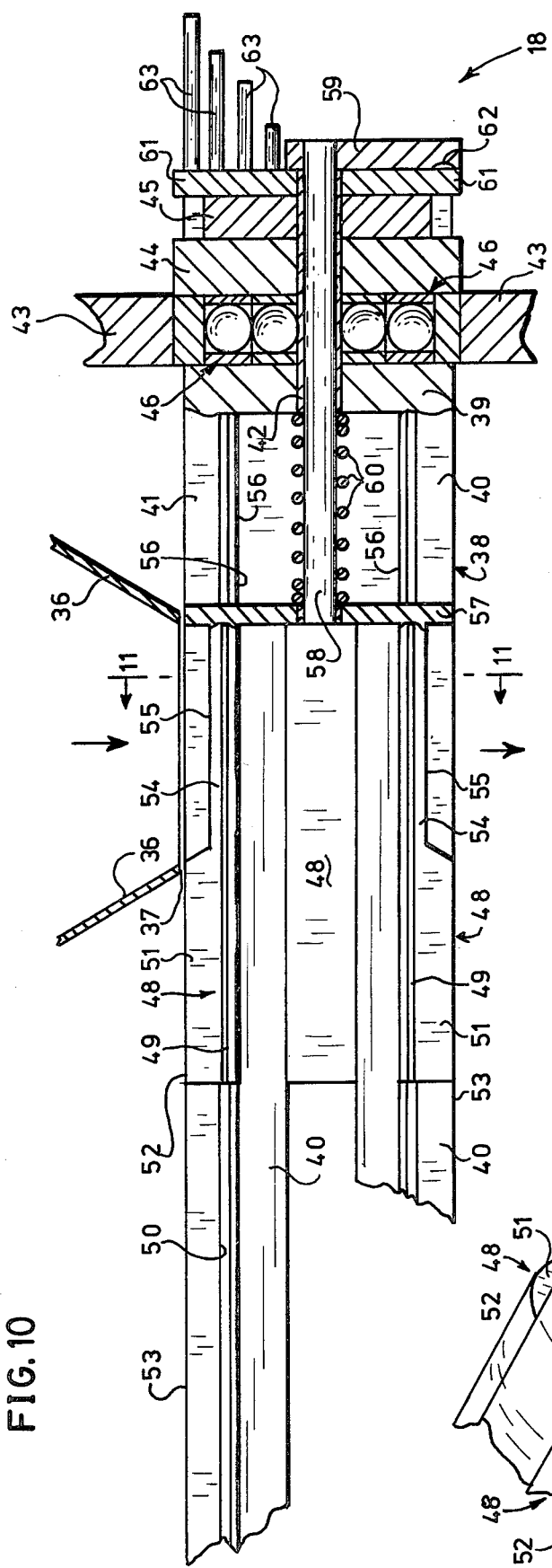

LAWN COMBINE

This invention relates to a lawn combine. More particularly, it relates to a self-powered lawn combine which seeds, fertilizes, aerates, and applies herbicides, insecticides and fungicides in prescribed dosages in one sweep across the lawn.

Various types of lawn care equipment are widely used by homeowners and gardeners for maintaining healthy and weed-free lawns. For example, there are a variety of hand-driven seeders and spreaders for applying seed as well as fertilizers, insecticides etc. to the lawn. There are also a number of hand-driven aerators which have a spiked roller which are used to aerate the lawn. However, these have been found to be disadvantageous since each of the tasks performed must be done separately, requiring a number of time-consuming sweeps across the lawn.

Attempts have been made to alleviate these time-consuming tasks by incorporating these various garden devices into one unit which would be driven by a tractor so that all of the various gardening tasks could be accomplished in one sweep of the lawn. However, these attempts have also been found to be unsatisfactory because of typical lawns such a unit is too large and cumbersome to maneuver in tight corners and other narrow or restricted areas of the lawn.

Accordingly, it is an object of the present invention to provide a novel, self-powered lawn combine which aerates and applies prescribed dosages of seed, insecticides, fertilizer, herbicides and fungicides in one sweep across the lawn.

It is also an object of the present invention to provide such a novel self-powered lawn combine which is relatively simple in design, durable, economical to fabricate and easy to use.

It is a more particular object of the present invention to provide a novel lawn combine having the foregoing attributes and characteristics which is compact, extremely easy to maneuver in tight corners and other narrow or restricted areas of the lawn.

Certain of the foregoing and related objects are readily-attained according to the present invention by the provision of a lawn combine which has a frame including a plurality of rotatable wheels supporting and coupled to the frame, and a drive-actuated rotatable aerator movably mounted on said frame for movement between a lower operative position, in which it is disposed for engagement with a lawn surface and an upper raised, inoperative position, in which it is disposed for non-engagement with the lawn surface. Means are provided for moving the aerator between the operative and inoperative positions thereof, and drive-actuated feed means are mounted on the frame for feeding materials in prescribed dosages to the lawn surface in an area generally beneath the frame. Drive means are also mounted on the frame for porpelling at least one of the wheels of the frame and for actuating the aerator and the feed means.

Preferably, the feed means includes a main hopper mounted on the frame having a lower opening through which material fed to the hopper is dispensed and a horizontal-disposed rotatable platform disposed beneath the hopper which collects the material dispensed through the lower opening and which, in a rotary propelling manner, sprays and uniformly spreads the material on the lawn surface in an area generally beneath the frame. Desirably, the platform has a plurality of radially-extending vanes disposed on the upper surface thereof and the drive means includes a motor coupled to the platform for effecting rotation thereof.

Most advantageously, the feed means includes a plurality of bins mounted on the frame, each of which communicates with the main hopper for feeding a particular material thereto. The bins each include drive-actuated regulator means for metering material fed thereto in prescribed dosages to the main hopper.

In a preferred embodiment, the bins each have a lower slot-shaped dispensing aperture associated therewith and the regulator means each include a rotatable, cylindrical sleeve having a plurality of longitudinally-extending slots formed therethrough spaced about the periphery thereof, which sleeve is rotatably supported on the frame such that at least a portion thereof is disposed beneath the slot-shaped dispensing aperture parallel to the longitudinal axis thereof. The slots are movable in a rotary fashion between a loading position, in which the slots oppose the slot-shaped aperture, and a discharge position in which material fed into the slots is discharged into the hopper. The regulator means also each include a plurality of interconnected rods, each of which is slidably mounted in one of the slots of the sleeve. The rods have a first portion having an upper surface which lies substantially flush with the outer circumferented surface of the sleeve and a second portion having an upper surface which lies substantially flush with the inner circumferential surface of the sleeve. The rods are movable between a first end position, in which the first portion thereof is disposed beneath the slot-shaped aperture, and a second end position, in which the second portion thereof is disposed beneath the slot-shaped aperture to thereby respectively permit and stop feeding of material to the hopper. Most desirably, control means are provided for controlling the position of the rods which includes a disc having a plurality of adjustment pins of different heights extending outwardly from one side thereof and a central bore extending therethrough, a generally disc-shaped handle disposed on one side of the disc and an adjuster shaft slidably supported on the frame, which slidably extends through the bore of the disc. The shaft has one end which is secured to the handle and an opposite end which is coupled to the rods. The handle is manually movable away from and toward the disc and is positionable against the end of one of the adjuster pins thereof for adjusting the position of the first and second portions of the rods relative to the dispensing aperture.

In a particularly preferred embodiment, the aerator includes a generally cylindrical drum having a multiplicity of preferably V-shaped spikes disposed about the periphery thereof and a rotatable drum shaft on which the drum is fixed and which is supported on the frame for free rotation and for pivotal movement between the operative and inoperative positions of the aerator. Most desirably, the drum consists of a multiplicity of spike rings having V-shaped spikes extending radially outwardly therefrom separated by annular spacer collars, both of which are fixed on the drum shaft. Most advantageously, the drive means includes an engine mounted on the frame having an engine drive shaft, a main drive shaft rotatably supported on the frame, first coupling means for coupling the engine drive shaft to the main drive shaft and for effecting rotation and stoppage of rotation of the main drive shaft. Also provided are second coupling means for coupling the main drive shaft to the aerator drum and for activating and deactivating the aerator, third coupling means for coupling the main drive shaft to the regulator means and for activating and deactivating the regulator means and fourth coupling means for coupling the main drive shaft to at least one of the wheels for driving the wheels and for disengaging the wheels from the main drive shaft.

Other objects and features of the present invention will become apparent from the following detailed description considered in connection with the accompanying drawings which disclose one embodiment of the invention. It is to be understood, however, that the drawings are designed for the purpose of illustration only and not as a definition of the limits of the invention.

In the drawings wherein similar reference characters denote similar elements throughout the several views:

FIG. 1 is a perspective view of a novel lawn combine embodying the present invention;

FIG. 2 is an enlarged, fragmentarily-illustrated top plan view thereof;

FIG. 3 is an enlarged, fragmentarily-illustrated top plan view of the lawn combine drive assembly;

FIG. 4 is an enlarged, fragmentarily-illustrated rear end view of the lawn combine drive assembly;

FIG. 5 is an enlarged, fragmentarily-illustrated rear end view of the lawn combine aerator;

FIG. 6 is a fragmentarily-illustrated, side elevational view of the lawn combine, with portions broken away or removed, showing the aerator in a lower, engaged position;

FIG. 7 is a fragmentarily-illustrated, side elevational view comparable to that of FIG. 6, but showing the aerator in a raised, non-engaged position;

FIG. 8 is an enlarged, fragmentarily-illustrated perspective view of the aerator, with the outer portions of its V-shaped spikes broken away;

FIG. 9 is an enlarged fragmentarily-illustrated top plan view of the lawn combine spreader assembly, with the upper auxiliary bins removed to show internal construction;

FIG. 10 is an enlarged, fragmentarily-illustrated longitudinal sectional view of the one of the spreader regulator assemblies;

FIG. 11 is a fragmentarily-illustrated perspective view of a portion of the regulator assembly taken along line 11—11 of FIG. 10;

FIG. 12 is an enlarged, perspective view of a control mechanism for the regulator assemblies;

FIG. 13 is an enlarged, perspective view of the rotatable spreader discharge platform;

FIG. 14 is an enlarged, perspective view of the lawn combine handle control panel;

Figure 17:
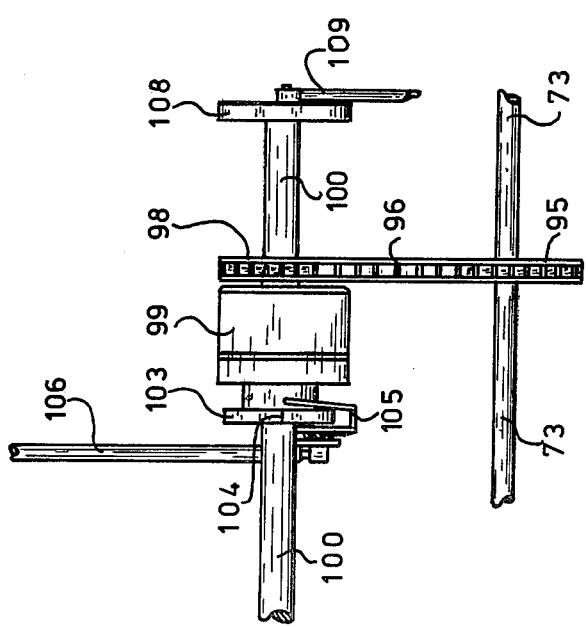
Figure 16:
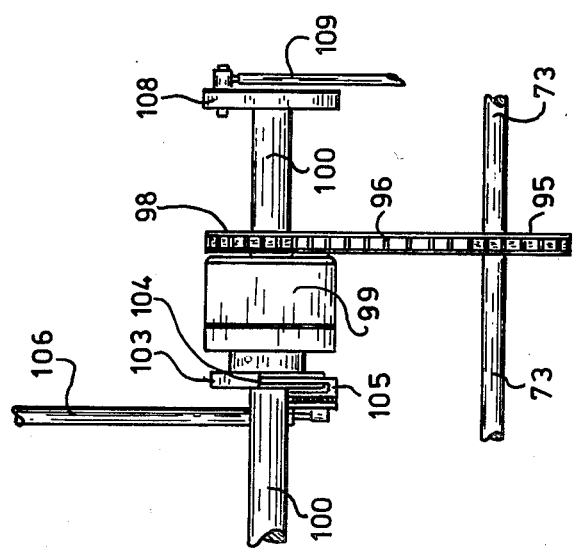

FIG. 16 is an enlarged, fragmentarily-illustrated top plan view of the clutch and drive assembly for the aerator, showing the position of a cam and cam follower when the aerator is in a raised, non-engaged position; and FIG. 17 is a fragmentarily-illustrated top plan view of the clutch and drive assembly for the aerator similar to that of FIG. 16 but showing the trip lever in a release position and showing the position of the cam and cam follower when the aerator is in a lower-engaged position.

Turning now in detail to the drawings and, in particular, FIGS. 1 and 2 thereof, therein illustrated is a novel lawn combine embodying the present invention which includes an inverted, generally U-shaped main frame 20.

Two spaced-apart handles 21 are connected to the rear end of main frame 20 and extend rearwardly and upwardly therefrom. The outer ends of handles 21 support therebetween a control panel 22, which will be described in greater detail hereinafter.

Main frame 20 has secured to its forward edge a pair of rearwardly-projecting, hinged flaps 23 which are normally disposed to cover the lawn combine drive assembly (which will be discussed in greater detail hereinbelow) and a generally flat, horizontally-disposed, rectangular auxiliary frame 24. Main frame 20 and auxiliary frame 24 are supported by a front wheel 25 and two rear wheels 26. Front wheel 25 is rotatably mounted between the arms of a yoke 27, the upper end of which is pivotably coupled to a trough-shaped forward portion 28 of auxiliary frame 24 to permit free turning rotation of front wheel 25. Rear wheels 26 are supported on the opposite ends of a rear axle 29 (FIG. 4) which is coupled (by means not shown) to main frame 20, rearwardly of its vertical sidewalls 30.

Depending from auxiliary frame 24 is a downwardly-tapered main hopper 31 having a lower dispensing aperture (not shown) through which lawn care materials (i.e., seed, fertilizers, insecticides, herbicides, fungicides, etc.) are dispensed onto the lawn beneath frame 24. To facilitate uniform spreading and application of the lawn care materials, a rotatable platform 32 having radially extending vanes 33 on the upper surface thereof (FIG. 13) is disposed beneath the dispensing aperture of main hopper 31. Platform 32 is secured to the lower end of a motor drive shaft 19 which has an upper end which is coupled to an electric motor 34 (see FIGS. 2 and 9) mounted on auxiliary frame 24.

Motor 34 may be powered by a battery (not shown) or other suitable means and is activated and deactivated by means of an on-off toggle switch 120 mounted on control panel 22 to which it is operatively coupled by means not illustrated. Activation of motor 34 will effect rotation of shaft 19 and, in turn, platform 32 so that lawn care material discharged from hopper 31 and collected on platform 32 will be propelled radially outwardly therefrom in a uniform pattern, under the action of vanes 33, over an area of the lawn generally beneath and adjacent to auxiliary frame 24.

To supply different lawn care products to main hopper 31, four generally rectangular auxiliary hoppers or bins 35, consisting of a forward pair and a rearward pair arranged side by side, are demountably secured atop auxiliary frame 24, above main hopper 31. As shown more clearly in FIGS. 9 and 10, each of bins 35 rest upon and discharge into a funnel-shaped member 36 having a lower slot-shaped dispensing aperture 37, through which material loaded in bins 35 is dispensed and fed into main hopper 31 (as shown by the arrows in FIG. 10).

In order to feed lawn care products in prescribed dosages to main hopper 31 and, in turn, the lawn, regulator assemblies 18 are provided which are associated with each of the pairs of bins 35 to regulate the amount of material fed from each bin 35 into main hopper 31. As seen best in FIGS. 10 and 11, the regulator assemblies 18 include an elongated cylindrical feed sleeve 38 having two disc-shaped end portions 39 (only one of which is shown). End portions 39 are interconnected by four longitudinally-extending and equidistantly and radially spaced-apart ribs 40 which define therebetween four longitudinally extending grooves, or slots 41 which, in cross section, define a cross-shaped channel. End portions 39 of sleeve 38 are each fixed to a support sleeve 42 (one of which is shown), each of which is rotatably supported by a bearing assembly 46 in the opposite lateral sidewalls 43 of auxiliary frame 24.

Disposed outwardly of each of the sidewalls 43, is a spacer collar 44 and a sprocket 45, each of which is fixed to support sleeve 42. Sprocket 45 is driven by a chain drive (which will be discussed hereinbelow) to effect rotation of support sleeve 43, and feed sleeve 38. The two feed sleeves 38 are oriented such that, upon rotation, slots 41 thereof will be successively aligned in a loading position underneath the slot-shaped dispensing apertures 37 of the associated forward or rearward pair of bins 35; slots 41 thereafter being rotated to a discharge position in which the material is discharged into main hopper 31.

In order to control the amount of material fed through each of the slots 41 of feed sleeve 38, four adjuster rods 48 are provided associated with each dispensing aperture 37. Rods 48 are each slidably mounted in one of the slots 41 of feed sleeve 38 by suitable means such as longitudinally-extending, laterally projecting flanges 49 which slidably mate with longitudinally-extending grooves 50 formed in the lateral walls of ribs 40. Alternately, rods 48 could possibly be fabricated as a single member having a cross-shaped cross-section so as to mate with the cross-shaped channel defined by ribs 40. Rods 48 each have a rearward end portion 51 having an upper surface 52 which lies flush with the outer peripheral surface 53 of ribs 40 and a forward end portion 54 having an upper surface 55 which is recessed relative to upper surface 52 of rearward portion 51 and which lies adjacent to the inner peripheral surface 56 of ribs 40.

The forward end portion 54 of rods 48 is joined to a support disc 57 which, in turn, is coupled for free rotation on the inner end of a control shaft 58 which extends through support sleeve 42. A generally disc-shaped control handle 59 is secured to the outer end of control shaft 58. Control shaft is spring-loaded by means of spring 60 biased between support disc 57 and end portion 39 of feed sleeve 38 such that the inner side of handle 59 normally abuts a disc-shaped position adjuster member 61 which is fixed to support sleeve 42, outwardly of sprocket 45. In this position, as shown in FIG. 10, the forward end portions 54 of rods 48 will be disposed beneath the dispensing aperture 37 to permit a maximum amount of material to be loaded in slots 41 of feed sleeve 38. However, the control handle 59 may be pulled away from adjuster member 61 and rotated such that a recess 62 formed in its inner side may be positioned on the end of one of four adjuster pins 63, having different lengths which extend outwardly from the outer side of adjuster member 61. As a result, at least a section of the rearward portion 51 of rods 48 will be moved underneath dispensing aperture 37 so as to limit the amount of material fed into slots 41.

This is more clearly illustrated in FIG. 9 which illustrates the various settings for control handle 59 and rods 48. As can be appreciated, the number and lengths of pins 63 may be varied as desired to provide a range of possible positions for rods 48, so as to meter the desired dosage of material into the receiving slots 41, between a possible maximum amount (i.e., when only the forward portion 54 of rods 48 is disposed beneath aperture 37) and a minimum of zero amount (i.e., when only the rearward portion 51 is disposed beneath the dispensing aperture). It should also be noted that due to the provision of separate rods 48 and control assemblies for each of the apertures 37 associated with each bins 35, the different lawn care products can be fed to the main hopper 31 according to different and desired proportions.

The lawn combine additionally includes a generally drum-shaped aerator 65 which, as shown in FIG. 8, consists of a plurality of spike rings 66 having V-shaped spikes extending radially outwardly therefrom separated by spacer collars 67, both of which are fixed on shaft 68. As illustrated in FIGS. 6 and 7, the opposite ends of shaft 68 are each rotatably supported on the outer end of a pivot lever arm 69. The inner ends of pivot lever arms 69 are pivotably supported on opposite sidewalls 30 of main frame 20 (not shown) and are interconnected by a support bar 64 (FIG. 5). As a result of this pivotal mounting of aerator 65 on frame sidewalls 30, it may be moved between a lower engaged position (FIG. 6) in which the spikes thereof dig into the lawn 130 and an upper or raised, non-engaged position (FIG. 7).

Figure 15:
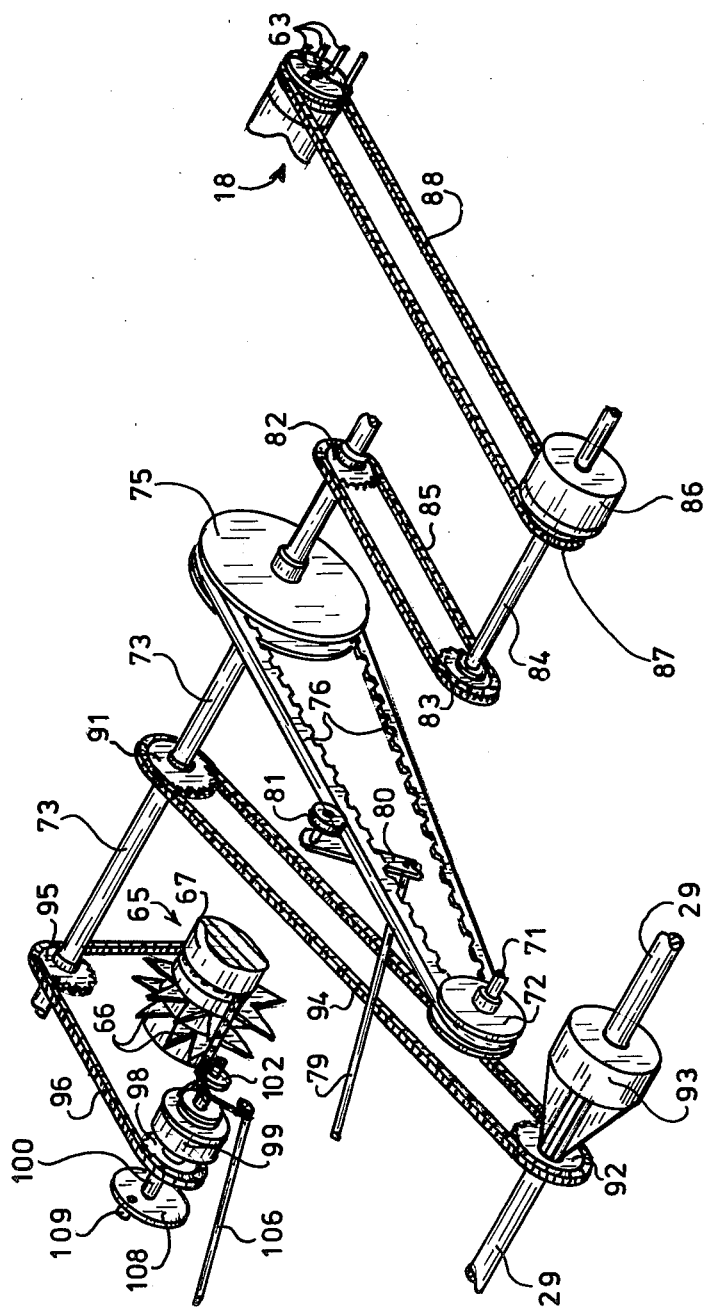
FIG. 15 is an enlarged, fragmentarily-illustrated perspective view of the lawn combine drive assembly.

Mounted atop of main frame 20 is a conventional gas-powered engine 70 (FIGS. 1 and 2) which, as shown in FIG. 15, includes an engine drive shaft 71 on the end of which is fixed a drive pulley 72. Also mounted atop of main frame 20 by means of a support 119 (FIG. 7), and spaced from, and parallel to, engine drive shaft 71, is a freely rotable main drive shaft 73. Main drive shaft 73 has fixed thereon a larger pulley 75 which is coupled to drive pulley 72 by means of an O-belt 76 so as to transmit the drive power from engine shaft 71 to main shaft 73.

As shown in FIG. 14, a drive control lever 78 is pivotably mounted on control panel 22 for movement between an up and down position and has coupled thereto the upper end of a push-pull rod 79. As shown in FIG. 15, the lower end of push-pull rod 79 is pivotably coupled to one end of a lever 80 which is pivotably mounted on frame 20 (by means not shown). The opposite end of lever 80 has a roller 81 coupled thereto which normally rides upon O-belt 76. By moving the control lever 78 to a down position, rod 79 will be pulled rearwardly, causing lever 80 to pivot and roller 81 to press against and tension O-belt 76 so as to effect drive engagement of engine shaft 71 with main shaft 73. Alternately, by moving control lever 78 to an up position, the rod 79 will be pushed forwardly causing lever 80 to pivot in an opposite direction so that roller 81 is moved to relax the tension in O-belt 76, thereby disengaging the drive.

A first sprocket 82 is fixed on the end of shaft 73 which is coupled by means of a chain 85 to a sprocket 83 mounted on a regulator drive shaft 84 supported atop of main frame 20 (by means not shown). Mounted on shaft 84 is an electric clutch 86 having a clutch sprocket 87 which is coupled by means of a chain 88 to one of the sprockets 45 of one of the rear regulator assemblies 18. The other sprocket 45 of the other rear regulator assembly is, in turn, coupled to one of the sprockets 45 of the forward regulator assemblies by means of a chain 89 (see FIG. 9). Clutch 86 is electrically coupled (by means not shown) to toggle switch 90 mounted on control panel 22 so as to permit and stop rotation of clutch sprocket 87 and, in turn, regulator assemblies 18 through chains 88 and 89.

A second sprocket 91 is fixed on shaft 73 and is coupled by means of a chain 94 to a sprocket 92 of differential 93 mounted on rear axle 29 so as to transmit drive power to rear wheels 26.

A third sprocket 95 is fixed to main shaft 73. Sprocket 95 is coupled by means of a chain 96 to a sprocket 97 (FIG. 8) recessed in the surface of aerator 65 and a clutch sprocket 98 of a conventional, single revolution clutch 99 mounted on an aerator drive shaft 100 (such as that sold by the Hilliard Corporation of Elmira, N.Y. and disclosed in their bulletin No. 239, dated March, 1975); shaft 100 being rotatably supported atop main frame 20 by means of support 101 (FIG. 7). Due to the fact that aerator 65 is movable between two positions, chain 96 is provided with sufficient slack to accommodate this action. In light thereof, a spring-loaded pulley 102 (supported by means not shown) is employed to maintain chain tension and ensure rotation of aerator 65 by means of drive chain 96.

Clutch 99 is employed to effect movement of aerator 65 between its upper and lower positions. As seen best in FIGS. 16 and 17, clutch 99 has a trip cam 103 having an abutment stop 104 which is disposed for engagement with a trip lever 105. Trip lever 105 is coupled in a known manner to the lower end of a push-pull rod 106, the upper end of which is coupled to a control lever 107 mounted on control panel 22 and movable between an up and down position. By moving lever 107 to a down position, the trip lever 105 is released, (FIG. 7) and shaft 100 rotates 180 degrees.

A flip cam 108 is fixed on clutch shaft 100 to which the upper end of a cam follower 109 is pivotably secured. The lower end of cam follower 109 is pivotably secured to the central portion of one of the pivot lever arms 69. As a result of the rotation of shaft 100, cam follower 109 assumes the position shown in FIG. 6 which causes downward pivoting of aerator 65 into its lower engaged position. Raising control lever 107, will then cause the clutch to release and permit shaft 100 to rotate another 180 degrees to bring the cam follower to the position shown in FIG. 7; this, in turn, causes raising of aerator to its upper, non-engaged position.

As can be appreciated from the foregoing, the aerator as well as the feed assemblies can be used independently or together. It should also be noted that other equivalent drive arrangements could be used to effect their operation. It would further be possible to couple to the rear of main frame 20 a seat for the operator, to allow him to ride on the combine during operation.

Thus, while only one embodiment of the present invention has been shown and described, it will be obvious to those persons of ordinary skill in the art, that many changes and modifications may be made thereunto, without departing from the spirit and scope of the invention.

What is claimed is:

1. A lawn combine, comprising:
   a frame including a plurality of rotatable wheels supporting and coupled to said frame;
   a drive-actuated rotatable aerator movably mounted on said frame for movement between a lower operative position, in which it is disposed for engagement with a lawn surface and an upper raised, inoperative position, in which it is disposed for non-engagement with the lawn surface;
   means for moving said aerator between said operative and inoperative positions thereof, mounted on said frame;
   drive-actuated feed means mounted on said frame for feeding materials in prescribed dosages to the lawn surface in an area generally beneath said frame, said feed means comprising a main hopper mounted on said frame having a lower opening through which material fed to said hopper is dispensed and a plurality of bins mounted on said frame, each of which has a lower slot-shaped dispensing aperture for feeding a particular material to said main hopper, said bins each including drive-actuated regulator means for metering material fed thereto in prescribed dosages to said main hopper, said regulator means each including a rotatable, cylindrical sleeve having a plurality of longitudinally-extending slots formed therethrough spaced about the periphery thereof, which sleeve is rotatably supported on said frame such that at least a portion thereof is disposed beneath one of said slot-shaped dispensing apertures parallel to the longitudinal axis thereof, said slots being movable in a rotary fashion between a loading position, in which the slots oppose said slot-shaped aperture, and a discharge position, in which material fed into said slots is discharged into said hopper, said regulator means also each including a plurality of interconnected rods, each of which is slidably mounted in one of said slots of said sleeve, said rods having a first portion having an upper surface which lies substantially flush with the outer circumferential surface of said sleeve and a second portion having an upper surface which lies substantially flush with the inner circumferential surface of said sleeve, said rods being movable between a first end position, in which said first portion thereof is disposed beneath said slot-shaped aperture, and a second end position, in which said second portion thereof is disposed beneath said slot-shaped aperture to thereby respectively permit and stop feeding of material to said hopper, said regulator means each also including control means for controlling the position of said rods; and
   drive means mounted on said frame for propelling at least one of the wheels of said frame and for actuating said aerator and said feed means.

2. The lawn combine according to claim 1, wherein said rods are spring-loaded so as to normally assume said first end portion.

3. The lawn combine according to claim 1, wherein said control means includes a disc having a plurality of adjustment pins of different heights extending outwardly from one side thereof and a central bore extending therethrough, a generally disc-shaped handle disposed on one side of said disc and an adjuster shaft slidably supported on said frame, which slidably extends through said bore of said disc, said shaft having one end which is secured to said handle and an opposite end which is coupled to said rods, said handle being manually movable away from and toward said disc and being positionable against the end of one of said adjuster pins thereof for adjusting the position of said first and second portions of said rods relative to said dispensing aperture.

4. The lawn combine according to claim 1, wherein said feed means comprises horizontally-disposed rotatable platform disposed beneath said hopper which collects the material dispensed through said lower opening and which, in a rotary propelling manner, sprays and uniformly spreads the material on the lawn surface in an area generally beneath said frame.

5. The lawn combine according to claim 4, wherein said platform has a plurality of radially-extending vanes disposed on the upper surface thereof.

6. The lawn combine according to claim 4, wherein said drive means includes a motor mounted on said frame and which is coupled to said platform for effecting rotation thereof.

7. The lawn combine according to claim 1, wherein said aerator comprises a generally cylindrical drum having a multiplicity of spikes disposed about the periphery thereof and a rotatable drum shaft on which said drum is fixed and which is supported on said frame for free rotation and for pivotal movement between said operative and inoperative positions of said aerator.

8. The lawn combine according to claim 7, wherein said drum comprises a multiplicity of spike rings having V-shaped spikes extending radially outwardly therefrom and a multiplicity of annular spacer collars, each of which is disposed between a pair of adjacent spike rings, said rings and collars being fixed to said drum shaft.

9. The lawn combine according to claim 7, wherein said spikes are V-shaped.

10. The lawn combine according to claim 7, wherein said drive means includes an engine mounted on said frame having an engine drive shaft, a main drive shaft rotatably supported on said frame, first coupling means for coupling said engine drive shaft to said main drive shaft and for effecting rotation and stoppage of rotation of said main drive shaft, second coupling means for coupling said main drive shaft to said aerator drum and for activating and deactivating said aerator, third coupling means for coupling said main drive shaft to said regulator means and for activating and deactivating said regulator means and fourth coupling means for coupling said main drive shaft to at least one of said wheels for driving said wheels and for disengaging said wheels from said main drive shaft.

* * * * *

UNITED STATES PATENT AND TRADEMARK OFFICE
CERTIFICATE OF CORRECTION

PATENT NO. : 4,196,678
DATED : APRIL 8, 1980
INVENTOR(S) : PAT LORE

It is certified that error appears in the above—identified patent and that said Letters Patent is hereby corrected as shown below:

Column 1, line 26, change "of" to --for--; line 58, change "porpelling" to --propelling--. Column 4, line 16, change "the" to --and--.

Signed and Sealed this

Fifteenth Day of July 1980

[SEAL]

Attest:

*Attesting Officer*

SIDNEY A. DIAMOND

*Commissioner of Patents and Trademarks*